United States Patent [19]
Jones

[11] 3,854,921
[45] Dec. 17, 1974

[54] GLASS MOLD COOLING SYSTEMS

[75] Inventor: Stanley Peter Jones, Doncaster, England

[73] Assignee: Emhart Corporation, Bloomfield, Conn.

[22] Filed: Sept. 4, 1973

[21] Appl. No.: 394,218

[30] Foreign Application Priority Data
Sept. 5, 1972 Great Britain.................... 41121/72

[52] U.S. Cl......................... 65/161, 65/162, 165/39
[51] Int. Cl............................................. C03b 9/38
[58] Field of Search ................. 65/161, 162; 165/39

[56] References Cited
UNITED STATES PATENTS
3,129,087  4/1964  Hagy...................................... 65/162
3,416,908  12/1968  Goodwin et al. ................. 65/161 X

*Primary Examiner*—Arthur D. Kellogg
*Attorney, Agent, or Firm*—Laurence A. Savage

[57] ABSTRACT

A cooling system for a glassware mold includes means for generating a flow of cooling air to pass over the surface of the glassware mold. There is additionally provided a cylindrical metallic body having similar cooling characteristics to the glassware mold and the surface of this body is subjected to a flow of cooling air similar to that which is passed over the surface of the glassware mold, whilst heat is continuously supplied to the cylindrical metallic body in order to maintain it at a temperature near to the desired operating temperature of the glassware mold during a glassware forming process. The temperature at or near the surface of the cylindrical metallic body is continuously sensed and fluctuations in this temperature are utilised in order to vary the rate at which the cooling air is passed over the surface of both the glassware mold and the cylindrical metallic body. The rate at which the cooling air cools the glassware mold is thus maintained substantially constant despite changes in the cooling capacity of the cooling air.

7 Claims, 2 Drawing Figures

GLASS MOLD COOLING SYSTEMS

BACKGROUND OF THE INVENTION

In manufacturing processes involving heat treatment, parts of the manufacturing apparatus are often cooled by blowing cool air over them, or by passing cool air through a system of cooling passageways within the part in order to maintain the parts at a desired operating temperature. for example, in the manufacture of glassware articles on the conventional glassware forming machines known as "I.S." machines, the molds and mold holders in the manufacturing apparatus are cooled by blowing cool air over their external surfaces in order to maintain an optimum "thermal balance" in the forming machine. A disadvantage of any such air cooling system is that the cooling capacity of the air being blown over the hot parts of the apparatus is liable to fluctuate. For example, at night time the air temperature normally falls and the density of the air increases and, as a result, the cooling capacity of the air is increased. Similarly, changes in the absolute humidity of the air can also alter the cooling capacity of the air. Additionally, where the same cooling system is used to cool a series of individual manufacturing machines, for example, six or eight sections of a conventional IS glassware forming machine, the rate of flow of the air over the hot parts of the manufacturing machinery will be increased if one section of the machinery is closed down for maintenance, or for any other reason, and this will result in an increased rate of cooling in the remaining sections.

In the continuous production of glassware and in similar hot forming processes, the maintenance of the correct thermal balance in the manufacturing apparatus is important in order to produce consistently well-formed glassware. Consequently, fluctuations in the rate of cooling of parts of the machine can have serious effects upon the quality of the product. Adjustments of the cooling system can be made manually by the operator of the manufacturing process, but the adjustments are necessarily tedious and can require a considerable degree of skill. Attempts have been made to produce cooling systems which automatically compensate for the variations in the cooling capacity of the air and such previous systems have involved controlling the rate of flow of air over the heated body in the manufacturing apparatus in response to variations in the temperature of the body itself. Such systems can however be difficult and sometimes dangerous to install and to maintain where the part of the machine being cooled is not readily accessible or is located in a hazardous environment, for example, the molds of an I.S. glassware forming machine. Alternative cooling systems have been developed in which the rate of flow of air over the heated body is controlled in response to variations in the humidity and/or temperature of the cooling air. None of these alternative systems has, however, proved entirely satisfactory because the cooling capacity of the air does not vary with changes in the humidity and/or temperature of the air in a manner which is completely analagous to the variation in the rate at which the hot body in the manufacturing apparatus is cooled by the air.

SUMMARY OF THE INVENTION

In accordance with the present invention, a cooling system for a first body to which heat is supplied during a manufacturing process provides for similar flows of cooling air to be passed over a surface of the first body and over the surface of a second body which has similar cooling characteristics to the first body. The second body is supplied with a regular flow of heat in order to maintain its temperature near to the desired operating temperature of the first body during the said manufacturing process. Control means dependent upon the temperature of the second body causes the flow of air over both bodies to be regulated so as to compensate for fluctuations in the temperature of the second body. The cooling system is therefore an analogue system in which the cooling conditions at the first body are simulated in the second body and changes in temperature of the second body are utilised to regulate the air flow so that the temperature of the first body is maintained substantially constant. The cooling system in accordance with the present invention therefore provides for the rate of cooling of the first body to be maintained substantially constant despite changes in the cooling capacity of the cooling air.

In order to provide similar cooling characteristics in the first and second bodies, preferably the second body is of the same type of material as the first body. For example, if the first body is metallic, then the second body is preferably metallic, and if the first body is a poor conductor of heat, then the second body should also be a poor heat conductor. Additionally, the shapes of the surfaces of the two bodies over which the cooling air flows should preferably be similar, and it will be appreciated that the cooled surfaces of the first and second bodies could either be external or internal surfaces. For example, if the first body has a curved external surface and is cooled by blowing air over the external surface, as in a generally cylindrical glassware mold, the second body should also have a curved external surface and should be cooled by passing air over this surface. A cylindrical or partly spherical block located in the stream of cooling air would be suitable.

BRIEF DESCRIPTION OF THE DRAWINGS

In order that the invention may be better understood, a preferred embodiment thereof will now be described, by way of example only, and with reference to the accompanying drawings, in which.

DETAILED DESCRIPTION OF THE INVENTION

Figure 1:
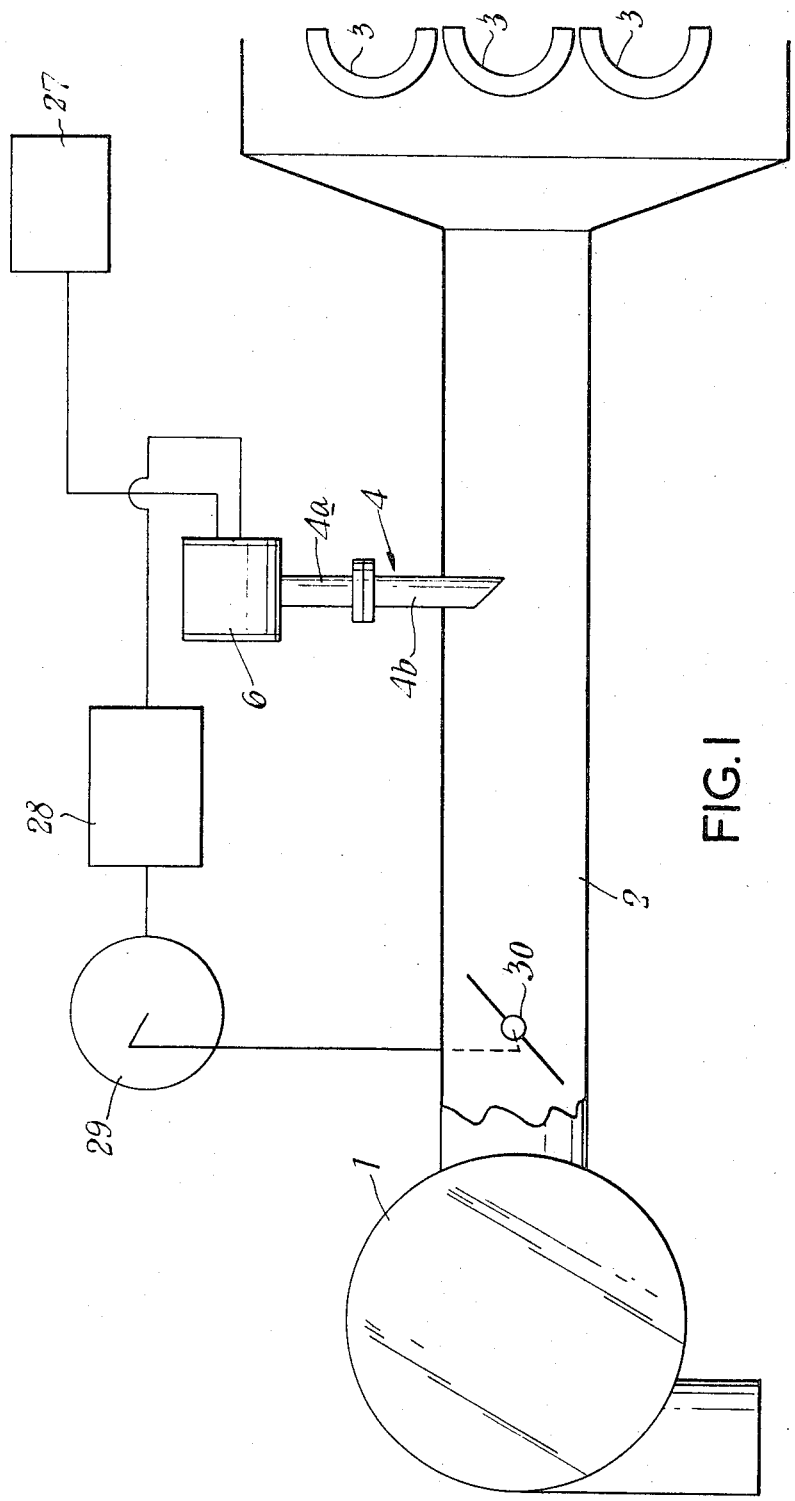
FIG. 1 is a diagram of a preferred cooling system in accordance with this invention.
Figure 2:
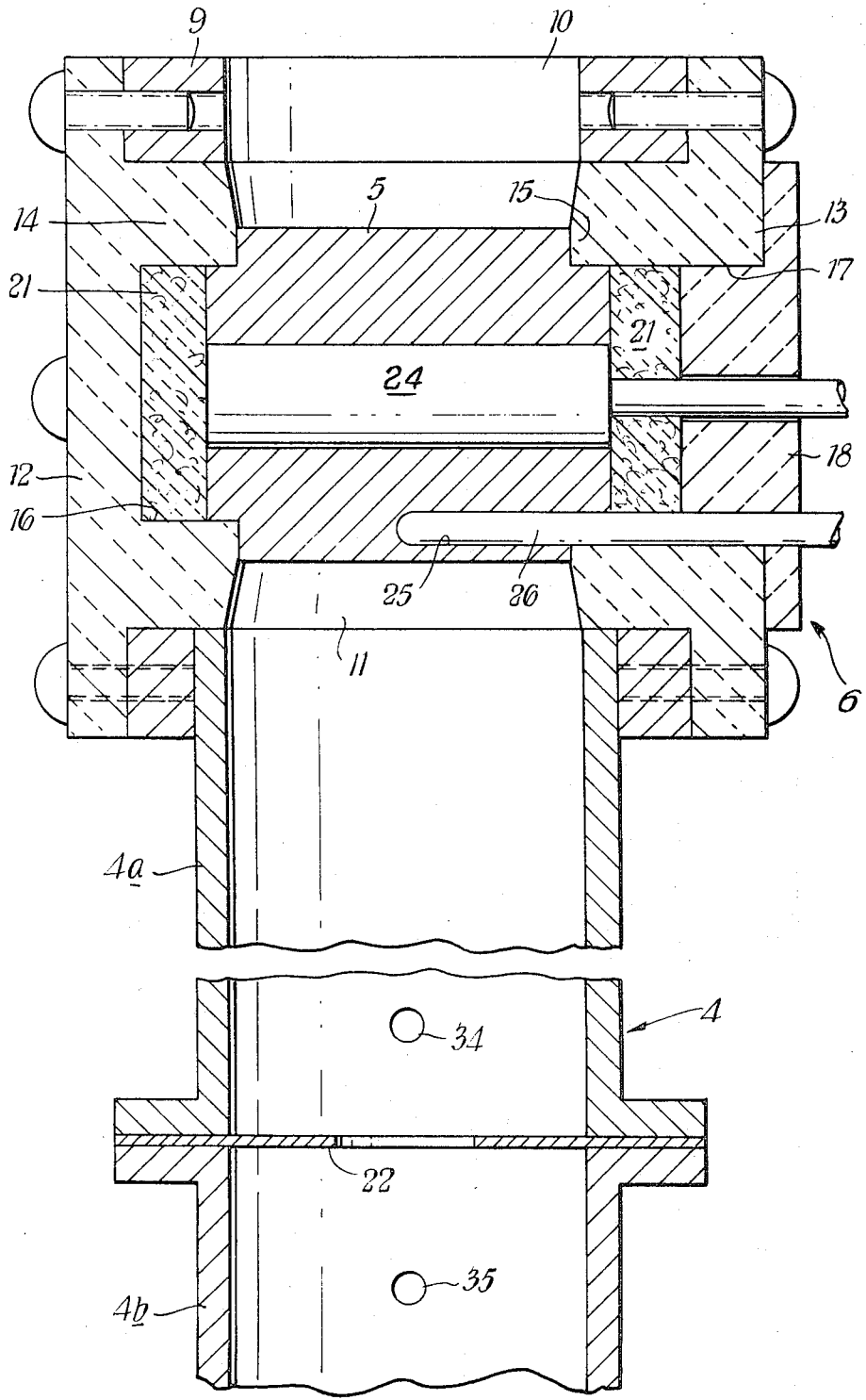
FIG. 2 is an enlarged view in cross-section of part of the cooling system shown in FIG. 1.

Referring to FIG. 1 of the accompanying drawings, a blower 1 directs cooling air through a valve 30 along a main duct 2 and over three bodies 3 which are molds in a glassware forming machine. These molds are made of cast iron and are generally semi-cylindrical in shape. A sampling duct 4 projects into the main duct 2 and, as shown in FIG. 2, directs a sample stream of air from the main duct over the surface of a cylindrical aluminium block 5, which is held in a housing 6 mounted on one end of the sampling duct 4. The sampling duct 4 is made up of two tubes 4a and 4b, the flanged ends of which are joined together. A standard orifice plate 22 is mounted in the sampling duct 4 between the flanges of the two tubes 4a and 4b. Tapping holes 34 and 35 are formed in the tubes 4a and 4b respectively, upstream and downstream of the orifice plate 22 and, by mounting pressure gauges (not shown) in these holes, the pressure difference across the orifice plate 22 can be determined. The flow rate of the air through the orifice can then be calculated from this pressure difference and the details of the standard orifice plate. The size of the orifice in the orifice plate 22 is so selected that the rate of flow of air over the surface of the metal block 5 will always be similar to the rate of flow of air from the main duct 2 over the glass molds 3. If desired, this orifice plate may be adjustable to enable the size of the orifice to be varied.

The housing 6 comprises a tube 9 which contains two apertures 10 and 11, one of which, 11, receives the end of the sampling duct 4. The ends of the tube 9 are closed by respective caps 12 and 13 which are bolted to the tube 9. Each cap is of a thermally insulating material such as "Marinite" (a compressed asbestos-based material) and includes an annular wall 14, 15, which projects into the tube 9. The annular wall 14 defines a central recess 16 in the cap 12 and the annular wall 15 in the cap 13 surrounds a central bore 17 in the cap 13, which bore 17 is closed by a flanged cap 18 which is also of thermally insulating material. The cylindrical block 5 is held in the housing by the annular walls 14 and 15 and asbestos wool 21 fills the remaining space in the recess 16 and the bore 17.

A cylindrical heating element 24 is located in a central axial bore in the block 5 and the electrical leads to this element pass through a central bore in the flanged cap 18. A further bore 25 in the block 5 receives a thermocouple 26, the leads of which pass through a further bore in the flanged cap 13.

The bore 25 in the cylindrical block 5 is located immediately beneath the surface of the block and the block is positioned in the housing 6 so that the bore 25 is located immediately adjacent the aperture 11. This arrangement enables the thermocouple to sense, as quickly as possible, changes in the surface temperature of the block 5 arising from fluctuations in the cooling capacity of the air emerging from the orifice in the orifice plate 22.

Air from the sampling duct 4 thus passes through the orifice plate 22, over the external surface of the cylindrical block 5 and exhausts to the atmosphere through the aperture 10 in the tube 9. If desired, a baffle plate may be mounted on the housing 6 adjacent the aperture 10.

Referring again to FIG. 1, a stabilised power supply unit 27 is connected to the heating element 24 and a controller 28 is connected to the thermocouple 26. The controller 28 operates in response to fluctuations in the temperature of the cylindrical block 5, as detected by the thermocouple 26, to energise a motor 29 which controls the valve 30 in the main duct 2.

When the system illustrated in the accompanying drawings is in operation, the fan 1 delivers air along the main duct 2 in order to cool the glass molds 3. A sample of the air from the main duct 2 passes through the sampling duct 4 and over the surface of the cylindrical block 5. The orifice plate 22 in the sampling duct 4 ensures that the rate of flow of air over the molds 3 and block 5 is similar. The stabilised power supply 27 feeds electrical energy at a constant rate into the heater 24 so that a constant flow of heat is maintained from the heater 24 to the cylindrical block 5. The heater 24 and power supply 27 are arranged so that the surface of the cylindrical block 5 is maintained at a temperature near the desired operating temperature of the external surface of the glass molds 3, e.g., 300° to 350°C. When the system has attained a thermal equilibrium, any changes in the surface temperature of the cylindrical block 5 can only be caused by a variation in the cooling capacity of the cooling air in the main duct 2.

If the cooling capacity of this air decreases, then the surface temperature of the cylindrical block 5 will increase. This increase in surface temperature will be detected by the thermocouple 26, and the controller 28 will cause the motor 29 to open the valve 30 thereby increasing the rate of flow of air along the main duct 2. Conversely, if the surface temperature of the cylindrical block 5 falls, this will only have been produced by an increase in the cooling capacity of the air in the main duct 2. The thermocouple 26 will detect this change in temperature and the controller 28 will respond to cause the motor 29 to close the valve 30 in the main duct 2 thereby decreasing the rate at which air is supplied to the molds 3.

Three factors in the design of the block 5 enable the cooling conditions at the glassware molds 3 to be reproduced at the cylindrical block 5. Firstly, both the block 5 and the glassware molds 3 are of a material which have similar, high thermal conductivities. The precise choice of metal for the block 5 is not usually critical, aluminium being preferred because of the ease with which it can be machined. Secondly, the surfaces of the block 5 and the glassware molds 3 over which the cooling air flows have generally similar shapes. Thus, the external surfaces of the molds 3 and the external surface of the block 5 are convex towards the stream of cooling air. Thirdly, the rates of flow of cooling air over the surfaces of the molds 3 and block 5 are, by virtue of the orifice plate 22, similar. These three factors enable the valve 30, which regulates the flow of cooling air from the blower 1 over the glassware molds 3, to be so controlled that fluctuations in temperature of the cylindrical block 5 are compensated for and the rate at which the cooling air cools the glassware molds 3 is maintained substantially constant. As a result, the temperature of the glassware molds 3 are maintained substantially constant.

If these three factors are identical in both the block 5 and the glassware molds 3, then the cooling conditions at the surface of the block 5 would be exactly similar to those at the surfaces of the molds 3, and precise control of the cooling system would result. In fact, the exact cooling conditions at the surfaces of the molds 3 can only be estimated, and consequently, the conditions produced at the surface of the block 5 are therefore only an approximation of the actual conditions at the mold 3. The control system may therefore tend to under-react or to over-react somewhat to fluctuations in the cooling capacity of the air. However, by effecting adjustments to the power supplied to the heater 24 or to the size of the orifice in the sampling duct 4 it is possible to adjust the rates of radiative and convective cooling at the block 5 until the overall rate of cooling of the block 5 closely approximates that of the molds 3. When the system has been adjusted in this way, excellent control of the cooling can be achieved.

The embodiment of the invention which has been described with reference to the accompanying drawings provides an analogue control system which can easily be incorporated into a conventional air-cooling system and which maintains accurate control of the cooling system. The sampling duct is located at a convenient point in the cooling system and can be adjusted and maintained as necessary, both quickly and safely. This represents a considerable advantage over cooling systems which are controlled in response to the temperature of the object being cooled and in which the object is located in a hazardous environment or an environment to which access is difficult for the installation and maintainance of a temperature sensing device.

Other arrangements falling within the scope of the present invention are contemplated. For example, the control means may be arranged to control the generating means by controlling the speed of the blower instead of by regulating the valve. Also the valve may be placed either upstream or downstream of the blower and indeed the valve need not be in the main duct 2.

I claim:

1. A system for controlling the rate of cooling of a first body to which heat is supplied during a manufacturing process, the system comprising means for generating a flow of cooling air to pass over a surface of the first body during the process, a second body which has similar cooling characteristics to the first body, means for causing a portion of said cooling air to pass over a surface of said second body, means for maintaining a regular flow of heat to said second body to maintain said second body at a temperature near a desired operating temperature of the first body during the process, and control means dependent upon the temperature of said second body for so controlling said means for generating the flow of air as to compensate for fluctuations in temperature of said second body, whereby the rate at which the cooling air cools the first body is maintained substantially constant.

2. A system as defined in claim 1, wherein the first body is a glassware mold and wherein the control means is dependent upon the temperature at or near the surface of said second body so that said means for generating said flow of air is controlled to compensate for fluctuations in the surface temperature of the second body.

3. A system as defined in claim 1, wherein the means for generating the flow of air over the first body includes a blower and valve means for controlling the rate of flow of air to the first body, said valve means being regulated by said control means.

4. A system as defined in claim 1, including a main duct along which the flow of cooling air is passed to the first body, a sampling duct for deriving a sample stream of cooling air from the air stream caused to flow in said main duct by said means for generating the flow of air and for directing said sample stream over the surface of said second body through an orifice which produces a similar rate of flow of cooling air over the surface of said second body to the rate of flow of cooling air over the surface of the first body.

5. A cooling system for a glassware mold comprising: generating means for generating a flow of cooling air, including a blower for directing cooling air along a main duct into contact with the glassware mold and a valve for controlling the rate of flow of cooling air along said main duct, a sampling duct for deriving a sample stream of cooling air from the air stream caused to flow in said main duct by said generating means and for directing the sample stream into contact with a body of material having similar cooling characteristics to the glassware mold at a rate of flow similar to the rate at which the cooling air from said main duct flows into contact with the glassware mold, means for supplying heat to said body at a constant rate, and control means operable in response to changes in the surface temperature of said body for regulating said generating means in such a way that the surface temperature of said body is maintained constant, whereby the rate at which the cooling air cools the glassware mold is such that the temperature of the glassware mold is maintained substantially constant.

6. A cooling system as defined in claim 5, wherein said control means operates said valve of said generating means in order to vary the rate of flow of cooling air to both the glassware mold and said body.

7. A cooling system as defined in claim 6, wherein said valve is located in said main duct.

* * * * *